May 29, 1956     E. I. GROFF     2,747,524

ROLLER APRON ASSEMBLY FOR PRETZEL TWISTING MACHINE

Original Filed Sept. 21, 1951

*INVENTOR.*
EDWIN I. GROFF
BY *Potts and Brune*
ATTORNEYS

United States Patent Office 2,747,524
Patented May 29, 1956

2,747,524

ROLLER APRON ASSEMBLY FOR PRETZEL TWISTING MACHINE

Edwin I. Groff, West Reading, Pa., assignor to Quinlan Pretzel Company, Inc., Reading, Pa., a corporation of Pennsylvania Original application September 21, 1951, Serial No. 247,631. Divided and this application August 30, 1952, Serial No. 307,287

3 Claims. (Cl. 107—9)

The present invention relates to the roller apron assembly which is ordinarily included in a pretzel twisting machine for the purpose of rolling a piece of dough which has been cut from a mass in the supply hopper into an elongated, cylindrical strip that is subsequently twisted into a pretzel. This application is a division of the co-pending application of Edwin I. Groff, Serial Number 247,631, filed September 21, 1951, and entitled "Pretzel Twisting Machine."

A pretzel twisting machine of the type with which the present invention is concerned, ordinarily includes a hopper that contains a supply of dough. The dough is delivered from the hopper to a pair of extruding worms which force it through an orifice and as it passes the orifice a knife cuts off individual pieces.

After the pieces of dough are cut from the mass by the knife, they are successively delivered to the bight between a pair of endless rolling aprons. The function of these aprons is to roll the dough pieces out into elongated strips. If a pretzel twisting machine of this type is to be practical, it must be capable of high speed operation. Thus, a machine is intended to twist from 120 to 180 pretzels a minute. This means that the dough strips between the rolling aprons are fairly close together and, from the viewpoint of optimum conditions of operation, it would be desirable that they assume a parallel relation normal to the direction of movement. However, it has been found as a practical matter that when these dough strips are rolled out straight it is impossible to achieve this optimum condition. One end or the other of certain of the strips will advance or lag and destroy the parallel relation.

With this condition in mind, another highly important object of the invention is to provide a pair of rolling aprons which are shaped and arranged to roll the dough pieces into strips having a slightly bowed or arcuate shape. The center of the bow assumes a retarded position and it has been found that with this shape imparted to the dough strips they may be maintained in proper relation.

Various other more detailed objects and advantages of the invention, such as arise in connection with carrying out the above noted ideas in a practical embodiment, will in part become apparent, and in part be hereinafter stated as the description of the invention proceeds.

The invention therefore comprises a roller apron assembly which rolls a piece of dough out into an elongated cylindrical strip having a slightly bowed or arcuate formation with the center of the bow assuming a retarded position.

For a full and more complete understanding of the invention, reference may be had to the following description and accompanying drawings wherein.

Figure 1:
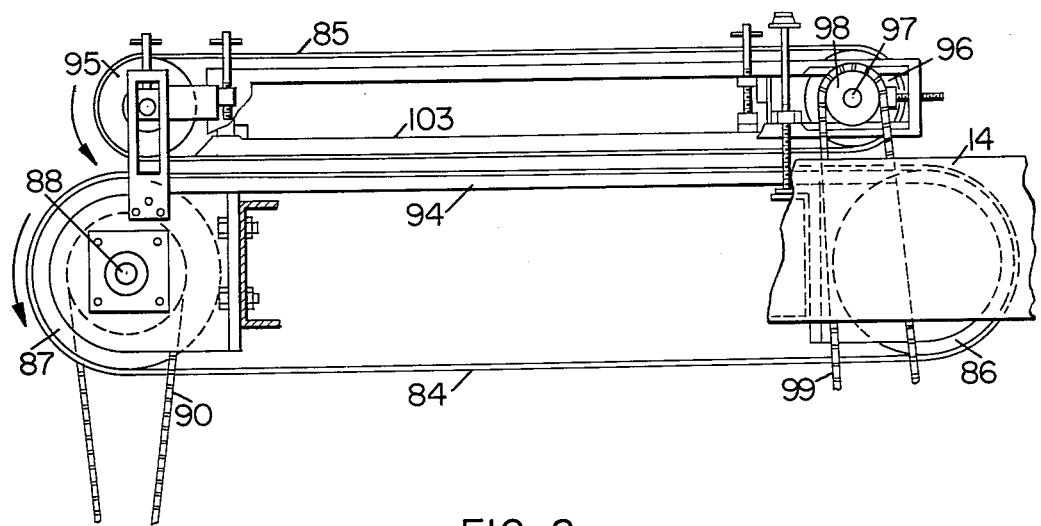
Figure 1 is a side view illustrating the roller apron ansembly.

The roller apron assembly comprises a lower apron 84 and an upper apron 85, both of which take the form of wide, endless belts of an appropriate fabric. It will be further noted from the several figures of the drawing that the lower apron is wider and longer than the upper apron and there is a greater distance between the flights thereof.

Figure 2:
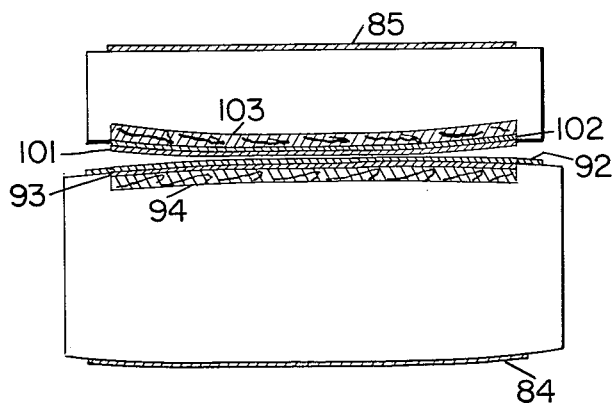
Figure 2 is a transverse vertical section through the roller apron assembly.

Referring now more particularly to Figures 1 and 2, the lower apron 84 passes over an idler roller 86 which is mounted on a shaft that is appropriately journalled in the frame of the machine. It also passes over a drive roller 87 that is carried by a shaft 88 and which shaft carries a sprocket over which passes a chain 90.

The top flight of the bottom apron 84 is represented at 92 in Figure 2. This top flight passes over a thin stainless steel plate 93 which is bowed upwardly from side to side throughout its length so as to impart a corresponding shape to the top flight 92. This stainless steel plate 93 is supported by a wooden table 94 which is in turn supported by the structure that is carried by the frame of the machine.

The top apron 85 passes over an idler roller 95 and also over a driving roller 96. The latter is mounted on a shaft 97 which carries a sprocket 98.

Referring now more particularly to Figure 2, the bottom flight of the top apron 85 is designated 101. This bottom flight passes over a stainless steel plate 102 which is bowed throughout its length and which imparts a corresponding curvature to the bottom flight 101. The plate 102 is carried by a wooden support 103 which is susceptible of adjustment to vary the curvature of the plate carried thereby. This bottom flight 101 of the top apron 85 is driven in a direction exactly opposite to that of the top flight 92 of the bottom apron and at a speed of about 60 per cent of that of the bottom apron.

At this point it is well to note that both the upper and lower aprons are provided with mechanisms for varying the tension thereof and also for adjusting the relative distance therebetween. Such mechanism is fully illustrated and described in the co-pending application of Groff, above referred to.

Due to the fact that the dough is delivered to the roller aprons in the form of a piece having a shape corresponding to that of the orifice through which it passes, the curvature of the top and lower flights of the lower and bottom aprons, respectively, is important. This shape not only results in a rolling out of the dough pieces into elongated strips, but also imparts to the strips themselves a curvature. This arcuate formation of the dough strips is important because with this shape it is possible and entirely practical to maintain the dough strips in proper relation to one another.

While a preferred specific embodiment of the invention is hereinbefore set forth, it is to be clearly understood that the invention is not to be limited to the exact construction, mechanisms, and devices illustrated and described because various modifications of these details may be provided, in putting the invention into practice within the purview of the appended claims.

What is claimed is:

1. In a pretzel-twisting machine, a roller apron assembly for rolling a piece of dough into elongated cylindrical strips, said assembly comprising: an upper roller apron in the form of an endless belt having a bottom flight, a steel plate having a transverse outward curvature within said belt and in sliding engagement with the upper surface of said bottom flight throughout the major part of the extent thereof, and a lower roller apron in the form of an endless belt having a top flight spaced relative to the bottom flight of said upper roller apron, and a steel plate having a transverse outward curvature and in sliding engagement with the undersurface of the top flight of said lower roller apron throughout the major portion of the extent thereof, said steel plates engaging the flights of the respective aprons to impart transverse outward curvatures thereto.

2. In a pretzel-twisting machine, a roller apron assembly for rolling strips of dough into elongated cylindrical strips, said assembly comprising: an upper roller apron in the form of an endless belt having a bottom flight, a transversely outwardly curved steel plate within said belt and in sliding engagement with the upper face of said bottom flight throughout the major portion of the extent thereof, and a lower roller apron longer and wider than said upper roller apron and having a top flight spaced relative to the bottom flight of said upper roller apron, and a transversely outwardly curved steel plate in sliding engagement with the underside of the top flight of said lower roller apron throughout the major portion of the extent thereof, said transversely curved steel plates imparting a corresponding curvature to the flights which slide thereover.

3. In a pretzel-twisting machine, a roller apron assembly for rolling pieces of dough into elongated cylindrical strips, said assembly comprising: an upper roller apron in the form of an endless belt having a bottom flight, a transversely outwardly curved steel plate in sliding engagement with the upper surface of said bottom flight throughout the major portion of the extent thereof, a wooden table supporting said plate; and a lower roller apron in the form of an endless belt having a top flight spaced relative to the bottom flight of said upper roller apron, a transversely outwardly curved steel plate in sliding engagement with the underside of the top flight of said lower roller apron throughout the major portion of the extent thereof, and a wooden table supporting said last-mentioned plate, said transversely curved plates imparting a corresponding curvature to the flights of the aprons which slide thereover.

References Cited in the file of this patent

UNITED STATES PATENTS

| | | |
|---|---|---|
| 1,169,472 | Embrey | Jan. 25, 1916 |
| 1,397,233 | Robbins | Nov. 15, 1921 |
| 2,026,526 | Gipe | Jan. 7, 1936 |
| 2,111,894 | Kosman et al. | Mar. 22, 1938 |
| 2,293,109 | Bridge | Aug. 18, 1942 |
| 2,295,246 | Weida | Sept. 8, 1942 |
| 2,431,073 | Palmer | Nov. 18, 1947 |

FOREIGN PATENTS

| | | |
|---|---|---|
| 23,998 | Great Britain | Oct. 19, 1909 |